United States Patent
Loy

(10) Patent No.: US 11,945,485 B2
(45) Date of Patent: Apr. 2, 2024

(54) SINGLE WHEELED KNUCKLE CARRIER

(71) Applicant: The Nolan Company, Canton, OH (US)

(72) Inventor: Robert Brian Loy, Navarre, OH (US)

(73) Assignee: THE NOLAN COMPANY, Canton, OH (US)

( * ) Notice: Subject to any disclaimer, the term of this patent is extended or adjusted under 35 U.S.C. 154(b) by 390 days.

(21) Appl. No.: 17/366,279

(22) Filed: Jul. 2, 2021

(65) Prior Publication Data

US 2023/0001971 A1    Jan. 5, 2023

(51) Int. Cl.
*B62B 1/14* (2006.01)
*B61G 7/00* (2006.01)
*B62B 1/26* (2006.01)

(52) U.S. Cl.
CPC .............. *B62B 1/14* (2013.01); *B61G 7/00* (2013.01); *B62B 1/26* (2013.01)

(58) Field of Classification Search
CPC ... B61G 7/00; B61G 7/02; B61G 7/04; B61G 7/10; B61G 7/14; B62B 1/00; B62B 1/14; B62B 1/26; B62B 1/10; B62B 1/18; B62B 1/22; B62B 1/24
See application file for complete search history.

(56) References Cited

U.S. PATENT DOCUMENTS

| | | | | |
|---|---|---|---|---|
| 2,722,897 A | * | 11/1955 | Morey | B61G 5/00 105/90.2 |
| 5,072,914 A | * | 12/1991 | Thrift | B61G 7/02 254/100 |
| 5,782,477 A | * | 7/1998 | Covert | B62B 1/268 280/47.32 |
| 5,876,018 A | * | 3/1999 | Crisp | B66F 7/08 254/33 |
| 5,884,920 A | | 3/1999 | Seto | |
| 6,902,184 B2 | * | 6/2005 | Hsu | B62B 1/208 280/47.32 |
| 6,904,977 B2 | | 6/2005 | Zerrer et al. | |
| 6,955,367 B1 | * | 10/2005 | Simonsen | A47B 83/02 280/47.32 |
| 7,175,188 B2 | * | 2/2007 | Joncourt | A45F 3/14 280/47.17 |

(Continued)

FOREIGN PATENT DOCUMENTS

| | | |
|---|---|---|
| CN | 2695316 | 4/2005 |
| DE | 20109068 | 2/2002 |

(Continued)

OTHER PUBLICATIONS https://rrtools.com/product/two-wheel-coupler-knuckle-cart/.
https://rrtools.com/product/two-wheel-knuckle-carrier/.

*Primary Examiner* — James M Dolak
(74) *Attorney, Agent, or Firm* — Sand, Sebolt & Wernow Co., LPA

(57) ABSTRACT

A compact single wheeled knuckle carrier which may be easily stowed and take up minimal space within the engine while simultaneously being easily maneuverable and robust enough to assist a person in carrying a train knuckle over rough terrain and over distance. The compact single wheeled knuckle carrier has a support member that couples the knuckle to the carrier and can include a slide lock to secure the knuckle to the support member.

20 Claims, 11 Drawing Sheets

(56) References Cited

U.S. PATENT DOCUMENTS

| | | | | |
|---|---|---|---|---|
| 7,950,687 B2* | 5/2011 | Ludlow | ............... | B62B 1/20 |
| | | | | 280/654 |
| 8,002,291 B1* | 8/2011 | Sandoval | ............ | B62B 5/0083 |
| | | | | 280/47.32 |
| 8,534,682 B2* | 9/2013 | Volin | ............ | B62B 1/22 |
| | | | | 280/651 |
| 9,216,796 B2* | 12/2015 | Kartalopoulos | ......... | B62B 1/18 |
| 9,527,655 B2 | 12/2016 | Kaufman | | |
| 10,858,022 B2* | 12/2020 | Chartier | ............ | B62B 1/22 |
| 11,352,030 B2* | 6/2022 | Handlin | ............ | B61G 7/04 |

FOREIGN PATENT DOCUMENTS

| | | | |
|---|---|---|---|
| JP | 11245822 | A | 9/1999 |
| JP | 2009262608 | A | 11/2009 |
| KR | 101716947 | | 3/2017 |
| RU | 2735878 | | 11/2020 |

\* cited by examiner

SINGLE WHEELED KNUCKLE CARRIER

TECHNICAL FIELD

The present disclosure relates generally to transport devices utilized in carrying replacement train knuckles. More particularly, in one example, the present disclosure relates to a one-wheeled carrier operable to support and carry a train car coupling knuckle. Specifically, in another example, the present disclosure relates to a compact single wheeled train car knuckle carrier operable to transport a train car knuckle over distance while occupying minimal space within a train engine or storage area.

BACKGROUND

Background Information

Trains perform an important transportation function around the world, including the transportation and movement of goods and people over long distances and at potentially very high speeds. Trains typically consist of a powered car commonly referred to as an engine or locomotive and a series of rail cars, which may be commonly referred to as train cars or railroad cars. These rail cars may be used in the transport of goods and materials across a distance as part of a cargo or freight train or may be used to transport people as part of a passenger train. While these rail cars tend to take many different forms and include many different types, rail cars tend to include one common component, namely, the coupling mechanisms which are commonly referred to as coupling knuckles or, simply, knuckles.

While these knuckles may take different forms and operate in different manners, they are generally standardized to fit rail cars of different types and different configurations across regions. For example, a common coupler known as the Janney coupler, is commonly used in North America, Japan, Australia, New Zealand, South Africa, Brazil, China, and elsewhere. As trains can be long and carry significant weight, these knuckles are quite robust, often weighing around 100 pounds or more to support the weight of the train being pulled by the engine or locomotive. Although they are robust, these knuckles are subjected to extreme stress and have a tendency to break over time. Thus, it is common that a train will have additional knuckles for use as replacements in the event of a knuckle break or failure.

Modern trains, particularly freight trains, can be extremely long, sometimes stretching longer than a mile or more from engine to the last car. In the event of a knuckle break, the engineer and/or other railroad employees must typically transport a new knuckle from its storage location in the engine to the location of the break. Again, as knuckles can be very heavy, typically around 100 pounds, and trains can be long, this may result in difficulty for the person or persons responsible for transporting a replacement knuckle to the location of the break.

Currently, knuckle carriers exist to alleviate the burden of carrying a 100 pound or more components over a great distance; however, each of the current solutions available has additional shortcomings. First, it is common for two persons to carry a knuckle in tandem utilizing a solid straight bar which may be inserted through an aperture in the knuckle and supported on each end by a person. These set ups still require the full weight of the knuckle plus the weight of the bar to be borne by individuals and carried over what could be a significant distance resulting in fatigue, wasted time, and even a high potential for injury to the persons carrying the knuckle, especially considering that the terrain that the two-person tandem team must traverse. Other carriers utilizing wheeled dollies and the like tend to have two wheels and a significant support system which can be bulky and heavy of its own as well as may occupy a large amount of space for storage and transport within the engine or in the compartment. While they alleviate the stress on the user, these carriers take up space in an area, such as the cabin or a compartment in the engine, where space is inherently limited and may be heavy and difficult to maneuver in and of themselves.

SUMMARY

The present disclosure addresses these and other issues by providing a compact single wheeled knuckle carrier which may be easily stowed and take up minimal space within the engine, or other location on the train, while simultaneously being easily maneuverable and robust enough to assist a person in carrying a train knuckle over rough terrain and over distance.

In one aspect, an exemplary embodiment of the present disclosure may provide a knuckle carrier comprising: a body having a handle at a first end thereof; a single wheel at a second end of the body of the knuckle carrier; a support plate attached to the body of the knuckle carrier proximate the wheel; a support member extending vertically from the support plate and parallel to the body of the knuckle carrier, the support member being configured to carry a coupler knuckle; and a slidable lock plate operable to lock the coupler knuckle in place on the support member.

In another aspect, an exemplary embodiment of the present disclosure may provide a method of transporting a coupler knuckle comprising: sliding a lock plate to a first position on a body of a knuckle carrier, wherein the lock plate is not engaged with a support member extending parallel to the body and vertically from a support plate connected to the body of the knuckle carrier; engaging a coupler knuckle with the support member; sliding the lock plate from the first position to a second position on the body of the knuckle carrier wherein the lock plate engages the support member; and moving the knuckle carrier from a first location to a second location using a single wheel connected thereto.

In yet another aspect, an exemplary embodiment of the present disclosure may provide a method of replacing a coupler knuckle comprising: removing a single-wheeled knuckle carrier from a storage position within an engine of a train; sliding a lock plate to a first position on a body of the knuckle carrier, wherein the lock plate is not engaged with a support member extending parallel to the body and vertically from a support plate connected to the body of the knuckle carrier; engaging a first coupler knuckle with the support member; sliding the lock plate from the first position to a second position on the body of the knuckle carrier wherein the lock plate engages the support member; moving the knuckle carrier from a first location to a second location via the single wheel; removing the first coupler knuckle from the knuckle carrier when the knuckle carrier is in the second location; and replacing a second coupler knuckle on a rail car with the first coupler knuckle.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
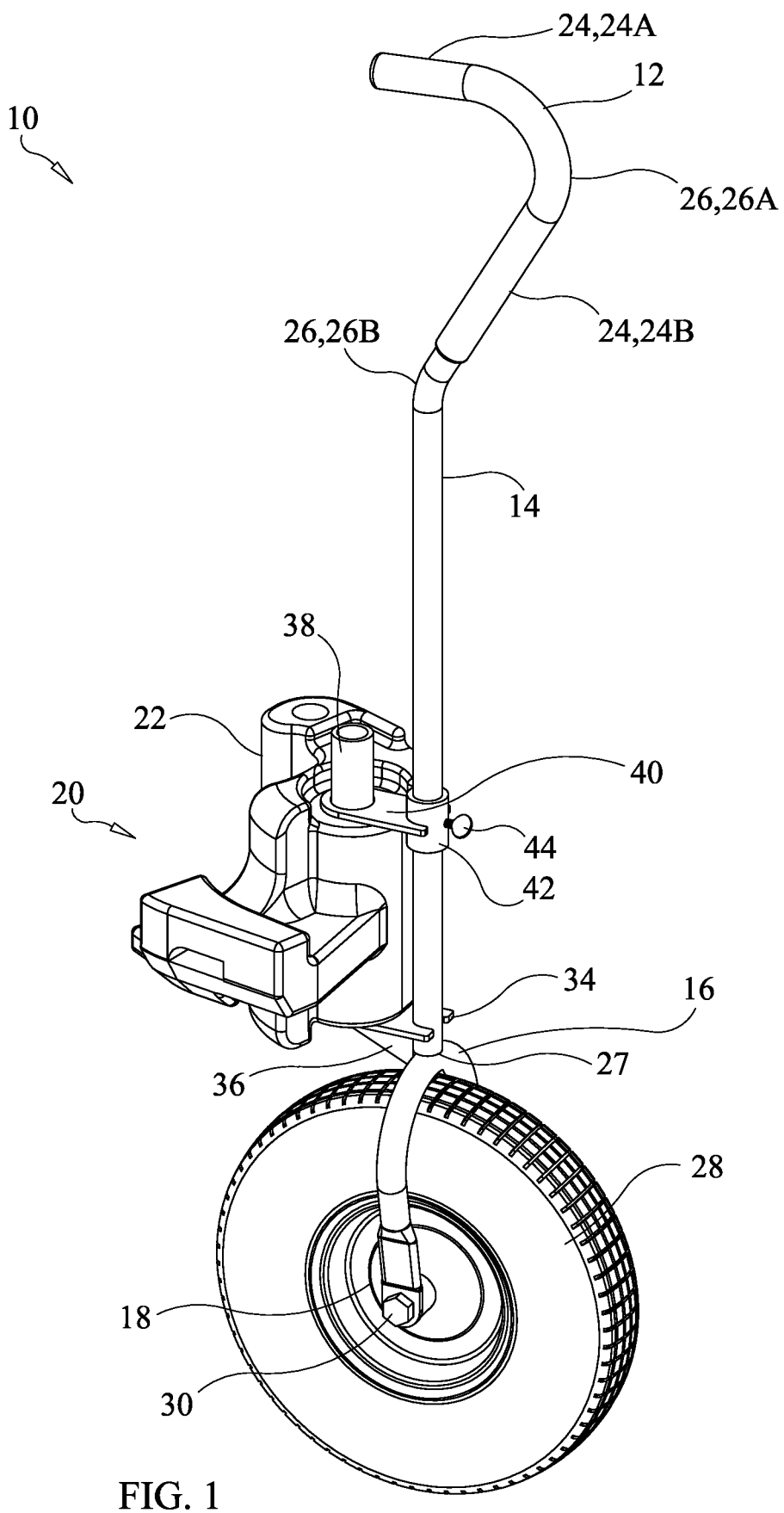
FIG. 1 is a left side perspective isometric view of a compact knuckle carrier, according to one aspect of the present disclosure.
Figure 2:
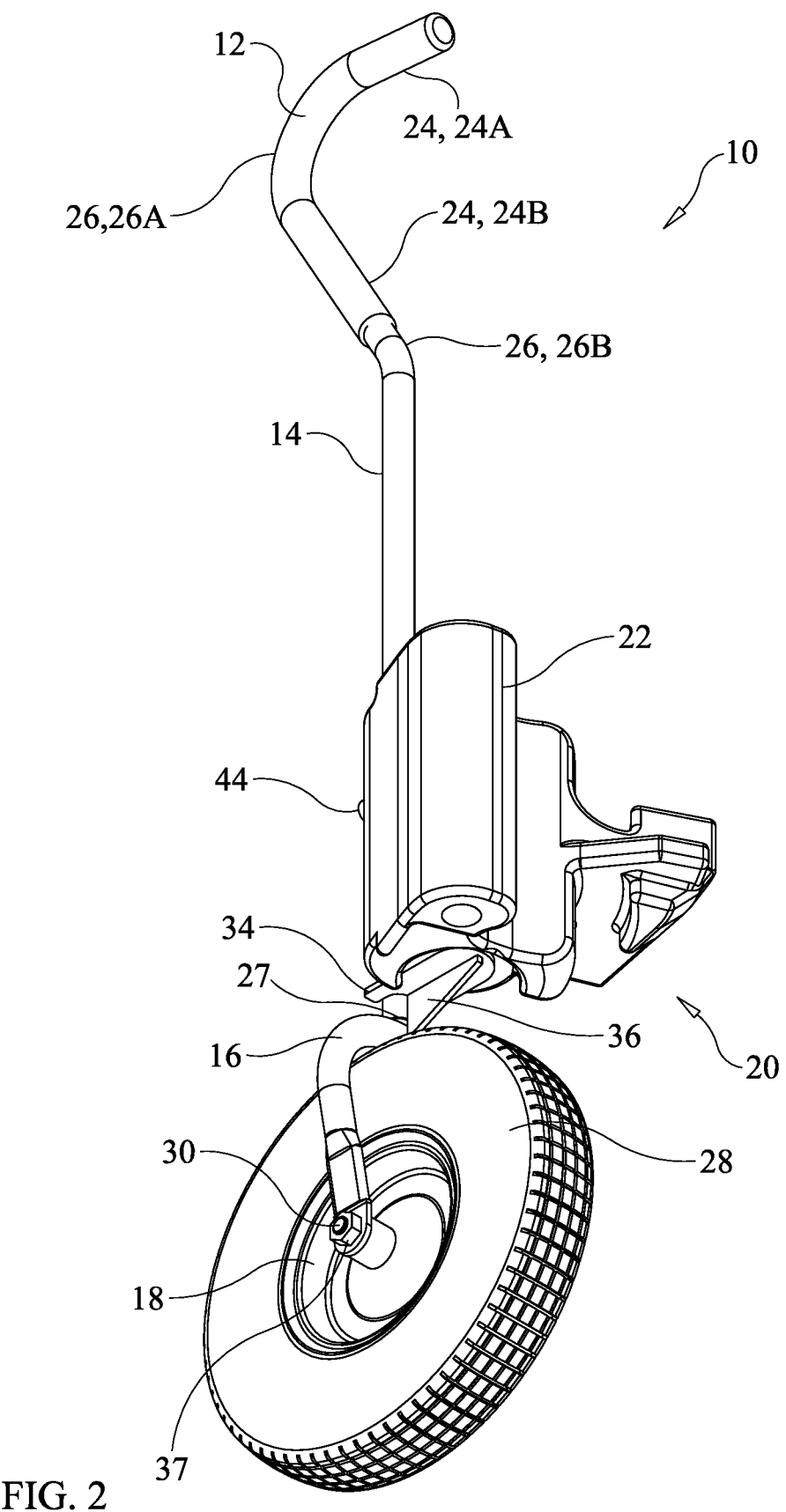
FIG. 2 is a front lower perspective right side isometric view of a compact knuckle carrier of the present disclosure.
Figure 3:
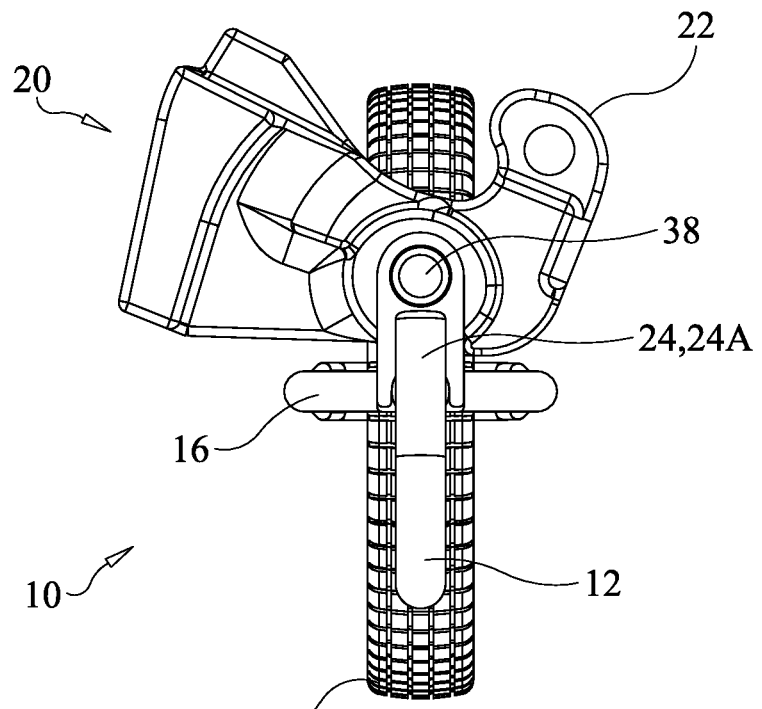
FIG. 3 is a top plan view of a compact knuckle carrier of the present disclosure.
Figure 4:
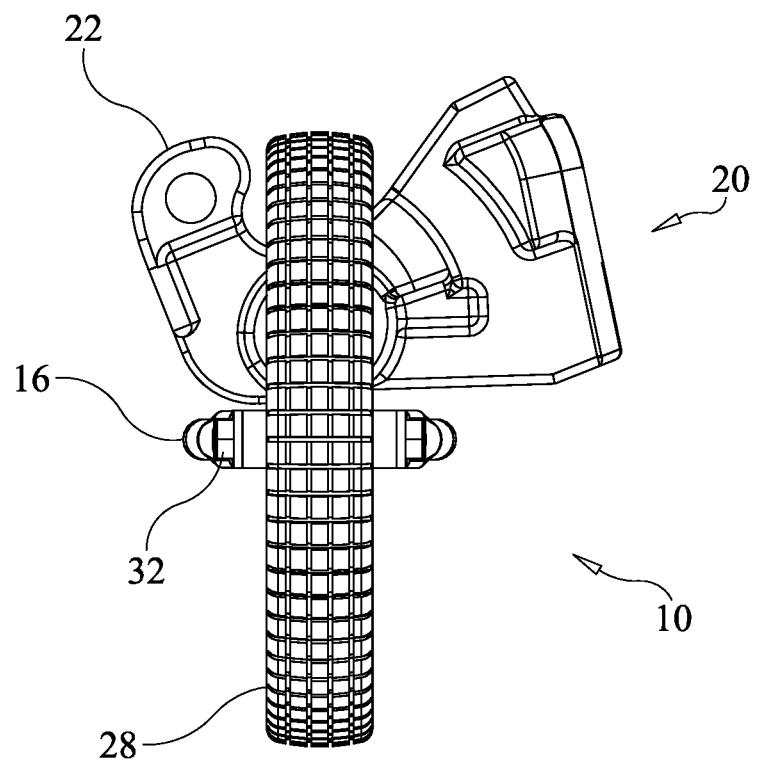
FIG. 4 is a bottom plan view of a compact knuckle carrier, according to one aspect of the present disclosure.
Figure 5:
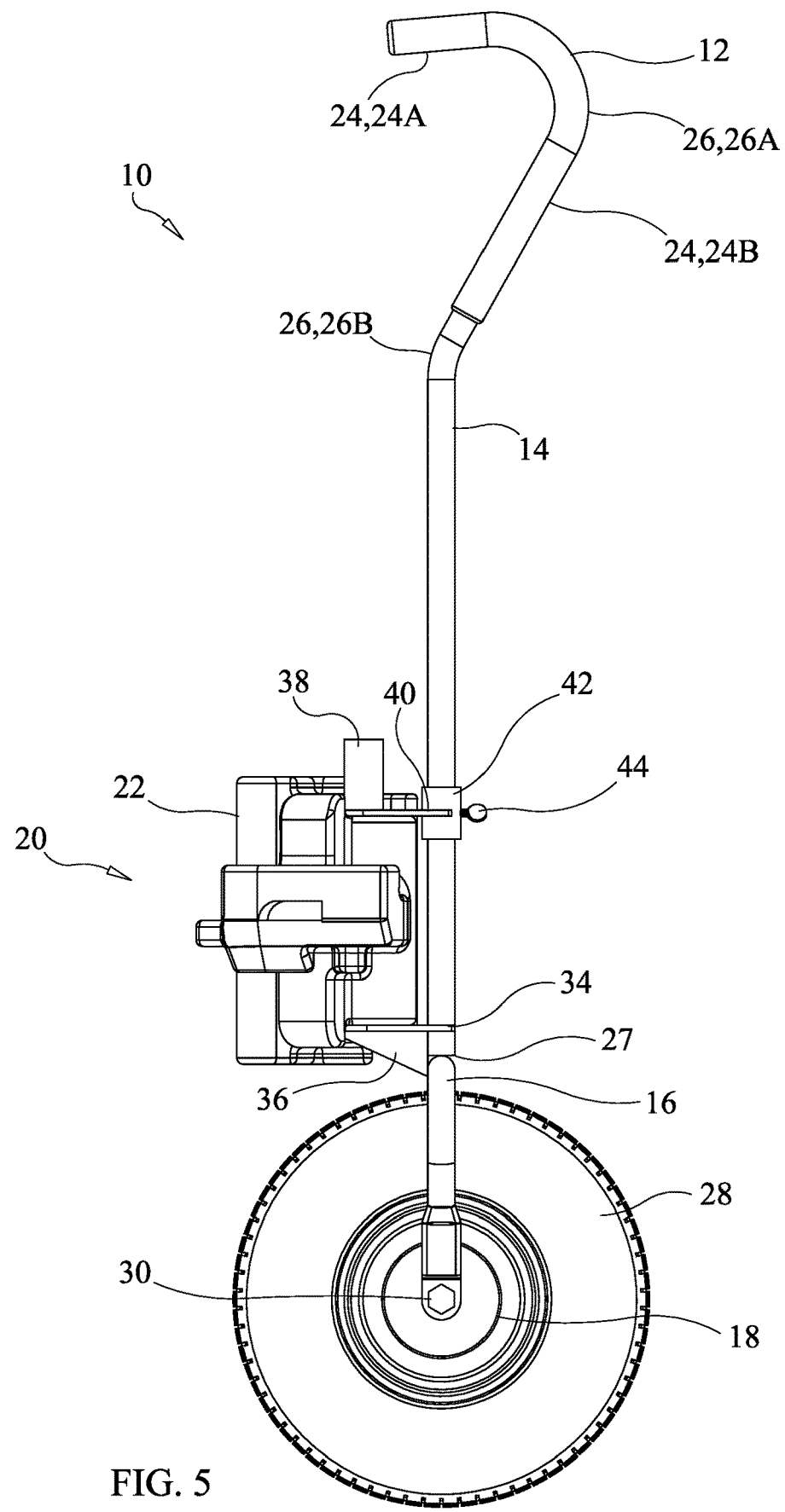
FIG. 5 is a left side elevation view of a compact knuckle carrier, according to one aspect of the present disclosure.
Figure 6:
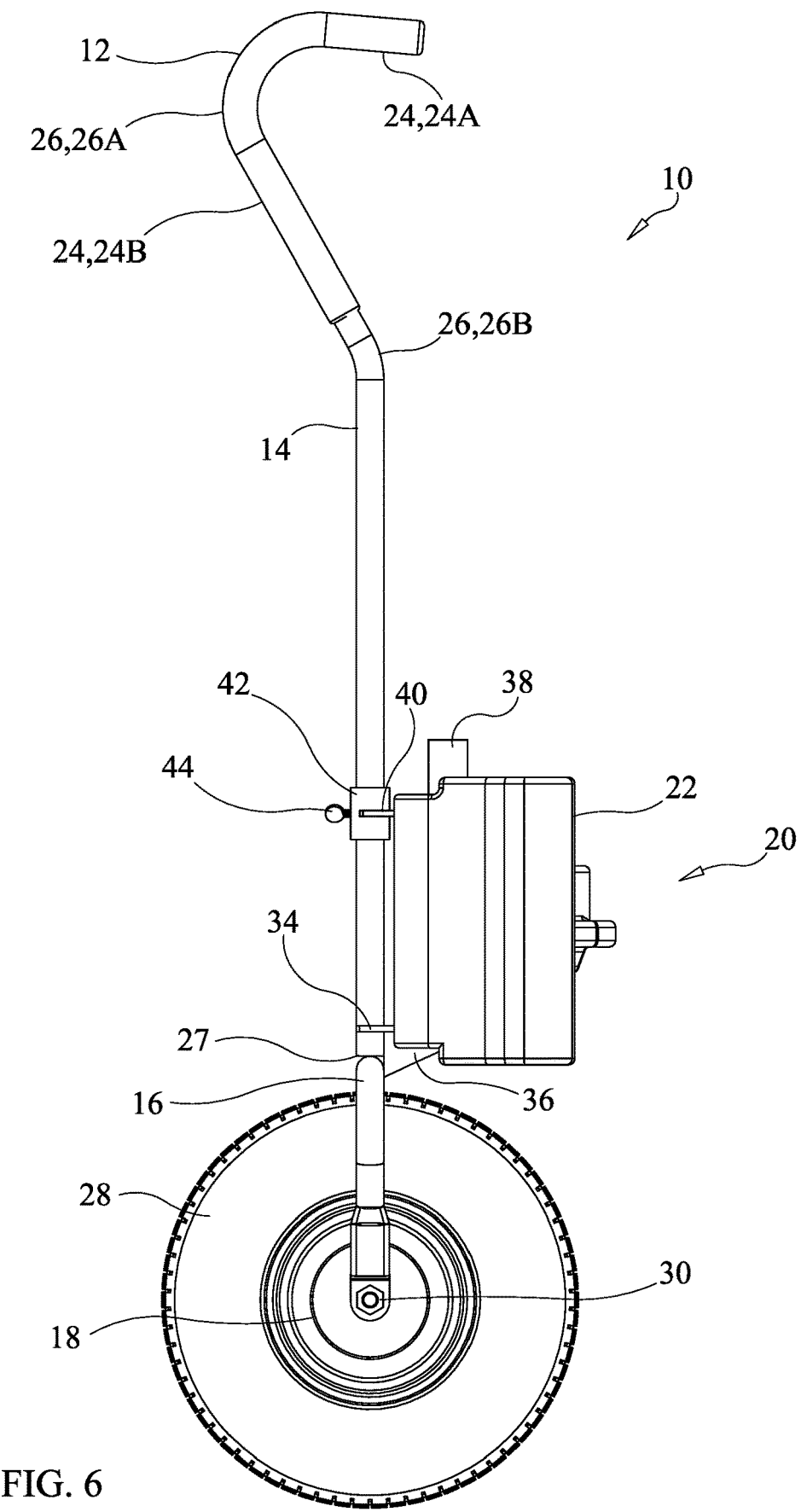
FIG. 6 is a right side elevation view of a compact knuckle carrier, according to one aspect of the present disclosure.
Figure 7:
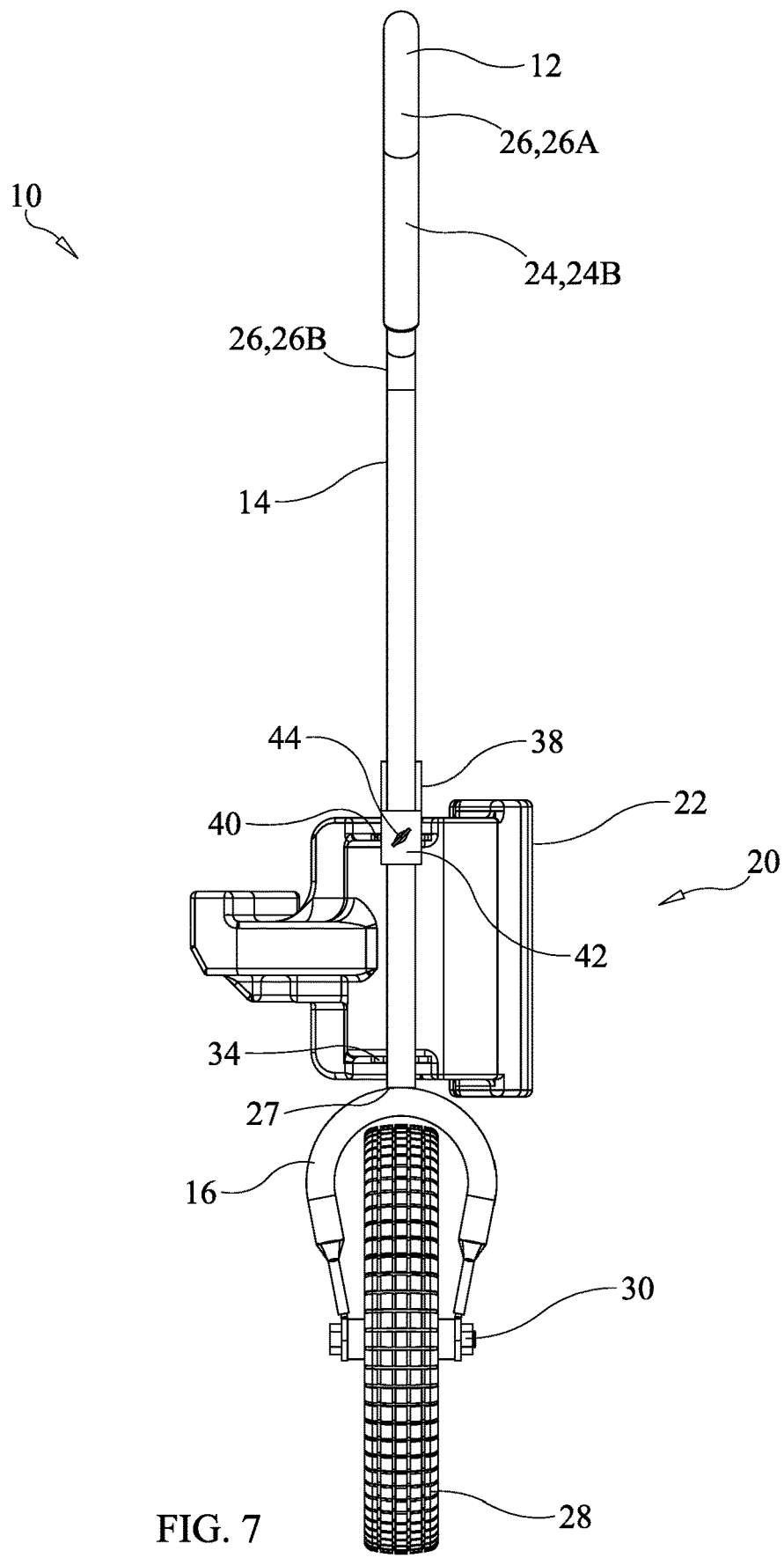
FIG. 7 is a rear elevation view of a compact knuckle carrier, according to one aspect of the present disclosure.
Figure 8:
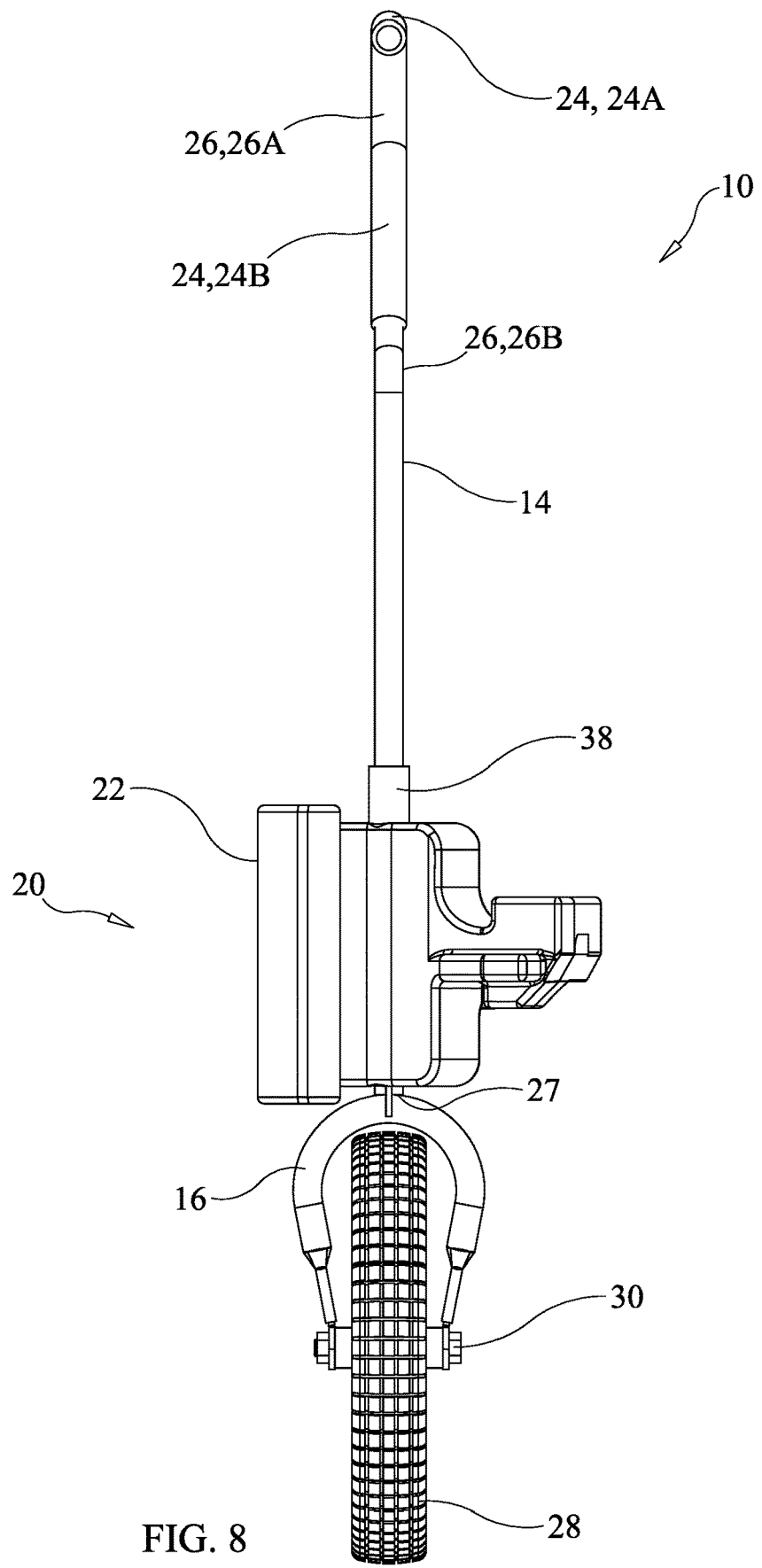
FIG. 8 is a front elevation view of a compact knuckle carrier, according to one aspect of the present disclosure.

With reference to FIG. 1 through FIG. 8, a single wheeled compact knuckle carrier is shown and generally referenced as carrier 10. Carrier 10 may include a handle 12, a body 14, a wheel fork 16 and ground-engaging wheel 18. Carrier 10 may further include a knuckle attachment assembly 20 operable to interact with and hold a train coupling knuckle 22, as discussed further herein.

Carrier 10 may be generally formed of a single length of material such as tubular steel or other similar materials and may extend vertically between handle 12 at a first end and wheel fork 16 at a second end opposite therefrom. Accordingly, handle 12 and body 14 may be integrally formed and may be shaped ergonomically, as discussed further herein, to assist and operator in utilizing carrier 10, as discussed below. Alternatively, handle 12 may be separate and distinct from yet connected to body 14 through any suitable means including mechanical fasteners, welding, epoxies, adhesives, or the like.

Handle 12 may further include one or more grip portions and/or grips indicated in figures at reference numeral 24. As shown and described herein, handle 12 may include a first grip 24A and a second grip 24B. Grips 24 may be placed strategically on handle 12 to provide multiple gripping surfaces that may be both ergonomically comfortable while providing maximum surface area for an operator to grip handle 12. Grips 24 may be any suitable material which may be placed over handle 12 such as rubber, leather, or the like, or may be textured material or textured sections of handle 12 such as a rubberized coating and/or knurled surface or the like, as dictated by the desired implementation.

Handle 12 may further include one or more bent sections indicated at reference 26, which may give handle 12 an ergonomic contour to allow ease in handling an operation while utilizing carrier 10, as discussed below. According to one example, handle 12 may include a first curved portion 26A which may provide that first grip 24A may be substantially parallel with a ground surface when the length of body 14 of carrier 10 aligned directly vertical. Further, according to this example, handle 12 may then include a second curved portion 26B to provide handle 12 with the proper contour while rejoining handle 12 with body 14.

Body 14 may then be an elongated generally vertical member extending between handle 12 at a first end and wheel fork 16 at the second end and may be, as discussed above, a generally straight section of tubular steel or other similar materials, as dictated by the desired implementation.

Wheel fork 16 may be joined to body 14 at joint 27 which may be a fixed or permanent connection such as through welding or the like, or may be a movable connection such as a swivel or the like. Alternatively, joints 27 may be formed using mechanical fasteners such as bolts, screws, or the like to allow wheel fork 16 and wheel 18 to be removed from body 14, as desired and/or as necessary. Wheel fork 16 may be of suitable width and length to accommodate a wheel 18 with a tire 28 installed thereon of varying sizes, according to the desired implementation.

Wheel 18 and tire 28 may be any standard or suitable wheel and tire arrangement including standard steel wheels 18 with pneumatic tire 28, solid tire 28 and/or a fully integrated wheel and tire system, again as dictated by the desired implementation. According to one aspect, wheel 18 and tire 28 may be a solid urethane, polyurethane, or other suitable material flat-free or puncture resistant wheel/tire combination; however, it will be understood that any suitable wheel and tire arrangement may be utilized. Wheel 18 and tire 28 may be connected wheel fork 16 via a bolt 30 and nut 32, as pictured, or through any other suitable attachment mechanism wherein wheel 18 and tire 28 may rotate and/or spin relative to carrier 10 through principles of normal operation. According to the example shown and described herein, wherein wheel 18 and tire 28 are attached via bolt 30 and nut 32, bolt 30 and nut 32 may generally form an axle about which wheel 18 and tire 28 may spin. Wheel 18 and tire 28 may including a braking system operatively coupled thereto with a brake control connected to any portion of the body 14 or handle 12 that would allow an operator to effectuate a braking action of the wheel 18 and tire 28 through actuation of the brake control. Wheel 18 and/or tire 28 may be any suitable size having any suitable diameter, width, tread depth, height, or the like. According to one aspect, wheel 18 and/or tire 28 may be a sixteen inch (16") diameter wheel/tire combination.

Figure 9:
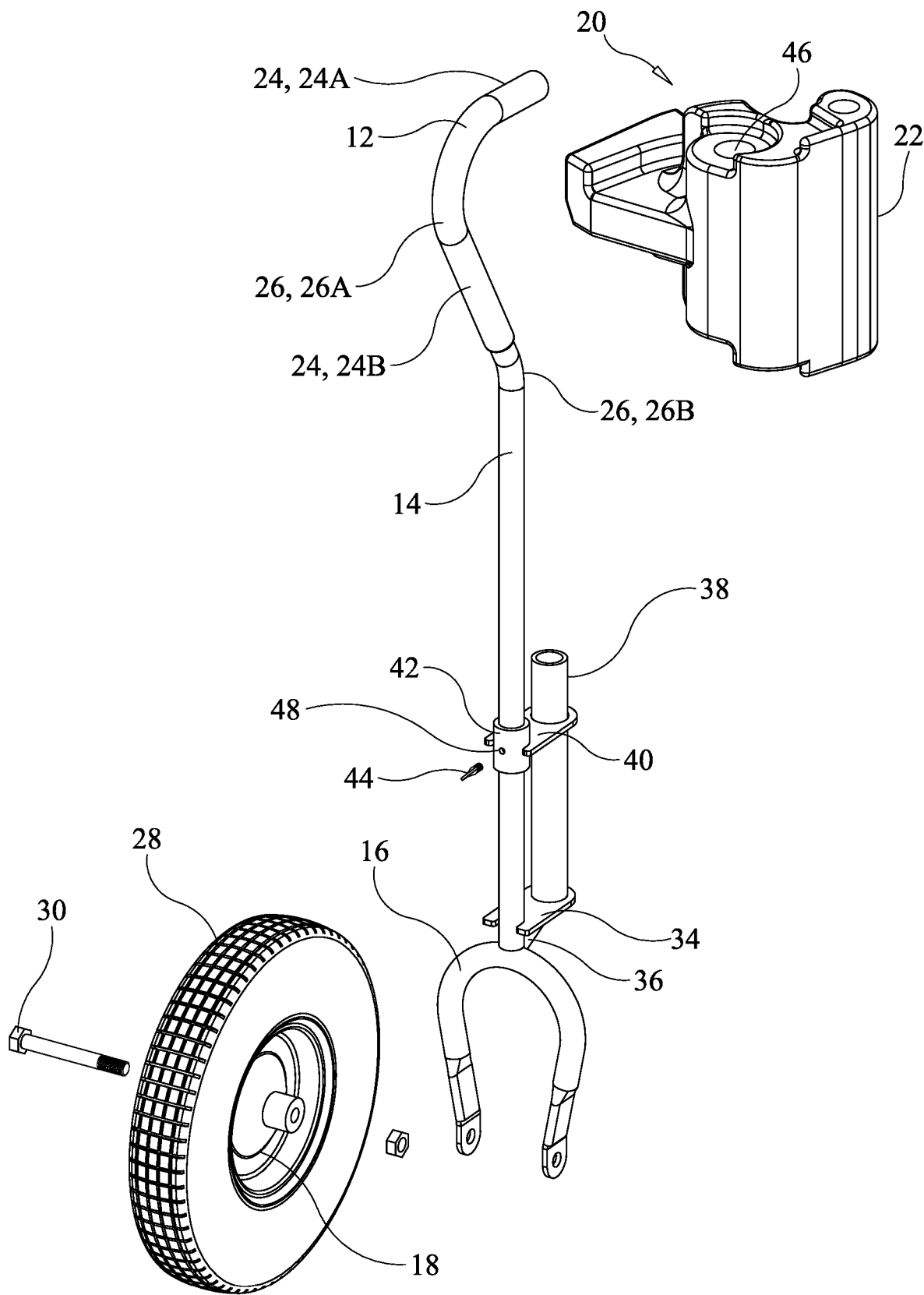
FIG. 9 is an exploded rear perspective view of a compact knuckle carrier, according to one aspect of the present disclosure.
Figure 10:
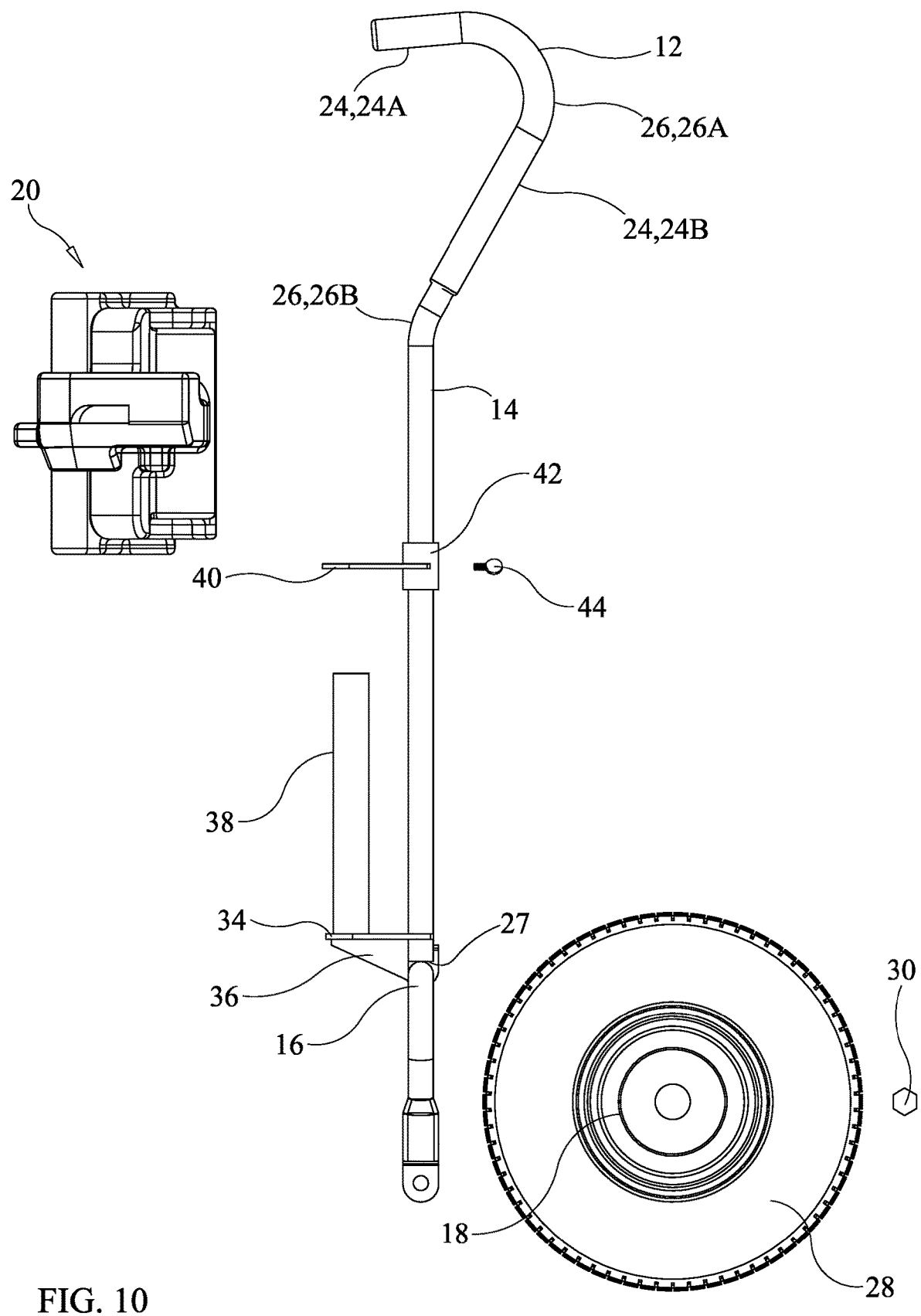
FIG. 10 is a left side elevation exploded view of a compact knuckle carrier, according to one aspect of the present disclosure.

Knuckle attachment assembly 20 may be formed and/or connected to body 14 and may further include a support plate 34 with a support gusset 36, a support member 38, movable lock plate 40 and lock collar 42. Knuckle attachment assembly 20 or simply knuckle assembly 20 may be operable to support, carry, and secure a knuckle 22 to carrier 10 for transport thereof, as described further herein. In particular, support member 38 may pass through an aperture 46 defined through knuckle 22 (best seen in FIG. 9 and FIG. 11).

Support plate 34 and gusset 36 may be fixedly attached to body 14 at or near wheel fork 16 through any suitable means including welding, mechanical fasteners, or the like, or any suitable combination of attachment mechanisms. However, it is possible for the support plate 34 to be affixed closer to handle 12, yet this may be less desirable as the center of gravity of the carrier should be as low as possible to provide greater stability of the carrier 10 when the knuckle 22 is attached. Support plate 34 and gusset 36 may be formed of any suitable material provided that is configured and sufficiently strong enough to support the weight of knuckle 22 over repeated uses of carrier 10, as well as during transport of knuckle 22, which may be performed over rough terrain. According to one non-limiting example, as shown and described, support plate 34 and gusset 36 may be formed of steel of sufficient thickness and size, as to impart the desired strength to support knuckle 22 and may be welded to body 14 and/or wheel fork 16 to impart suitable strength thereto.

Support member 38 may then extend vertically from support plate 34 and may generally be parallel to body 14. Support member 38 may be a section of tubular steel or similar materials suitably sized to secure knuckle 22 to knuckle assembly 20, as described further herein. More particularly, support member 38 has a diameter that is complementary to or slightly smaller than the diameter of aperture 46 on knuckle 22 to allow the support member 38 to slidably receive the knuckle thereon through the aperture 46.

Figure 11:
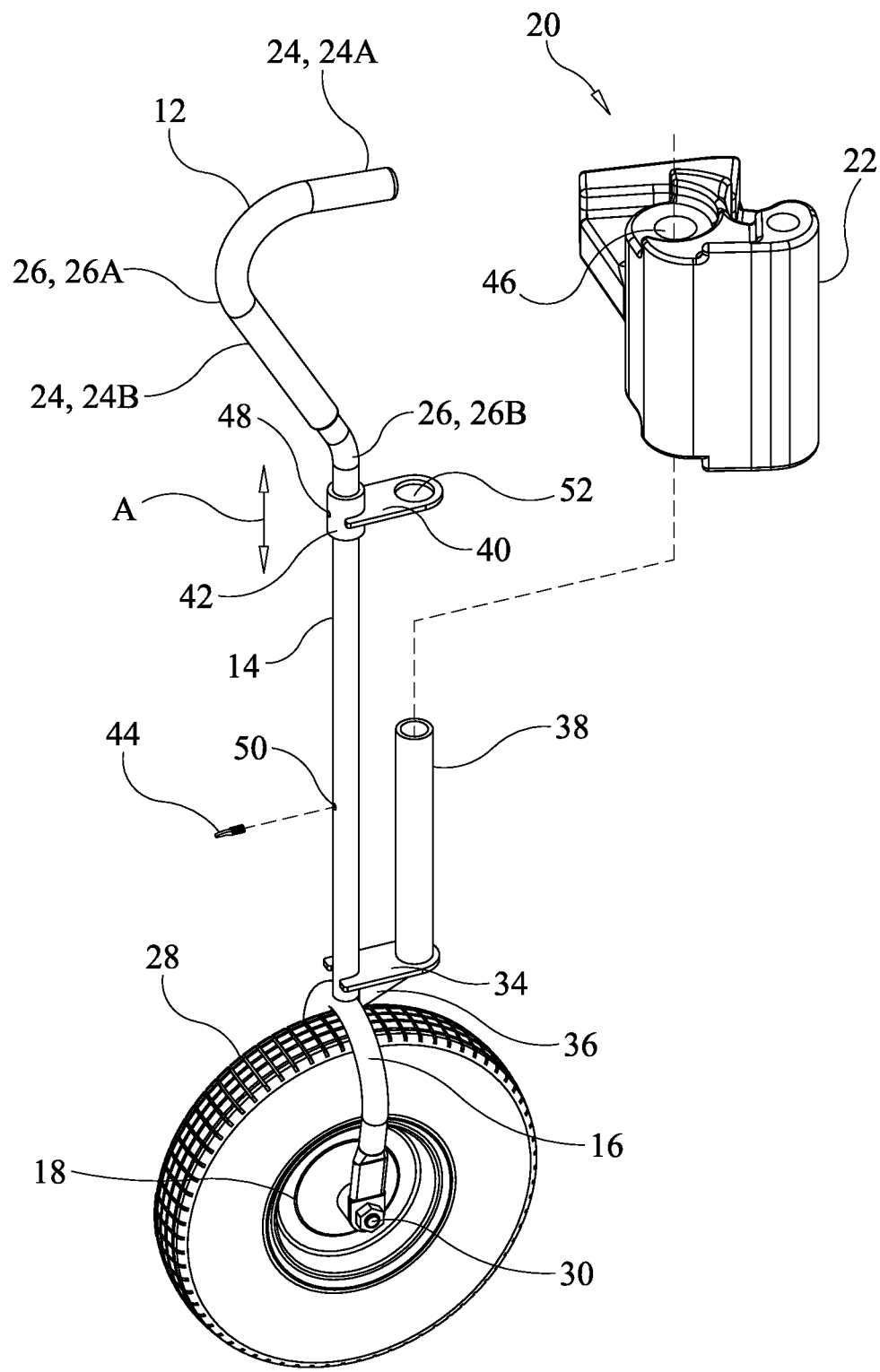
FIG. 11 is an operational view of a compact knuckle carrier, according to one aspect of the present disclosure.

Lock plate 40 and lock collar 42 may be formed as a single unit, which may be vertically slidable about body 14 to allow clearance and space for knuckle 22 to be installed and removed from knuckle assembly 20, as described further below. Lock plate 40 and lock collar 42 may be formed of any suitable material such as steel or other similar metals and may include a thumbscrew 44, which may pass through a thumbscrew aperture 48 defined in collar 42 to interact with body 14, as discussed below, to secure lock plate 40 and lock collar 42 in position. According to one aspect (as best seen in FIG. 11), body 14 may further include a screw aperture 50 which may be complementary to thumbscrew aperture 48 in lock collar, which may allow thumbscrew 44 to interact with both lock collar 42 and body 14 to secure lock plate 40 and lock collar 42 in a specific position, which may be a position defined by the standardized size of a train knuckle 22. According to another aspect, screw aperture 50 may be omitted and thumbscrew 44 may operate on a tension principle wherein the tension between thumbscrew 44 and body 14 may secure or hold lock plate 40 and lock collar 42 in position, as desired. Lock plate 40 may further define an aperture 52 which may be placed and sized to accept a portion of support member 38 therethrough as to further secure knuckle 22 thereon, as discussed further below. Aperture 52 is best seen in FIG. 11.

Having thus described the elements and components of carrier 10, the use and operation thereof will now be discussed.

Figure 12:
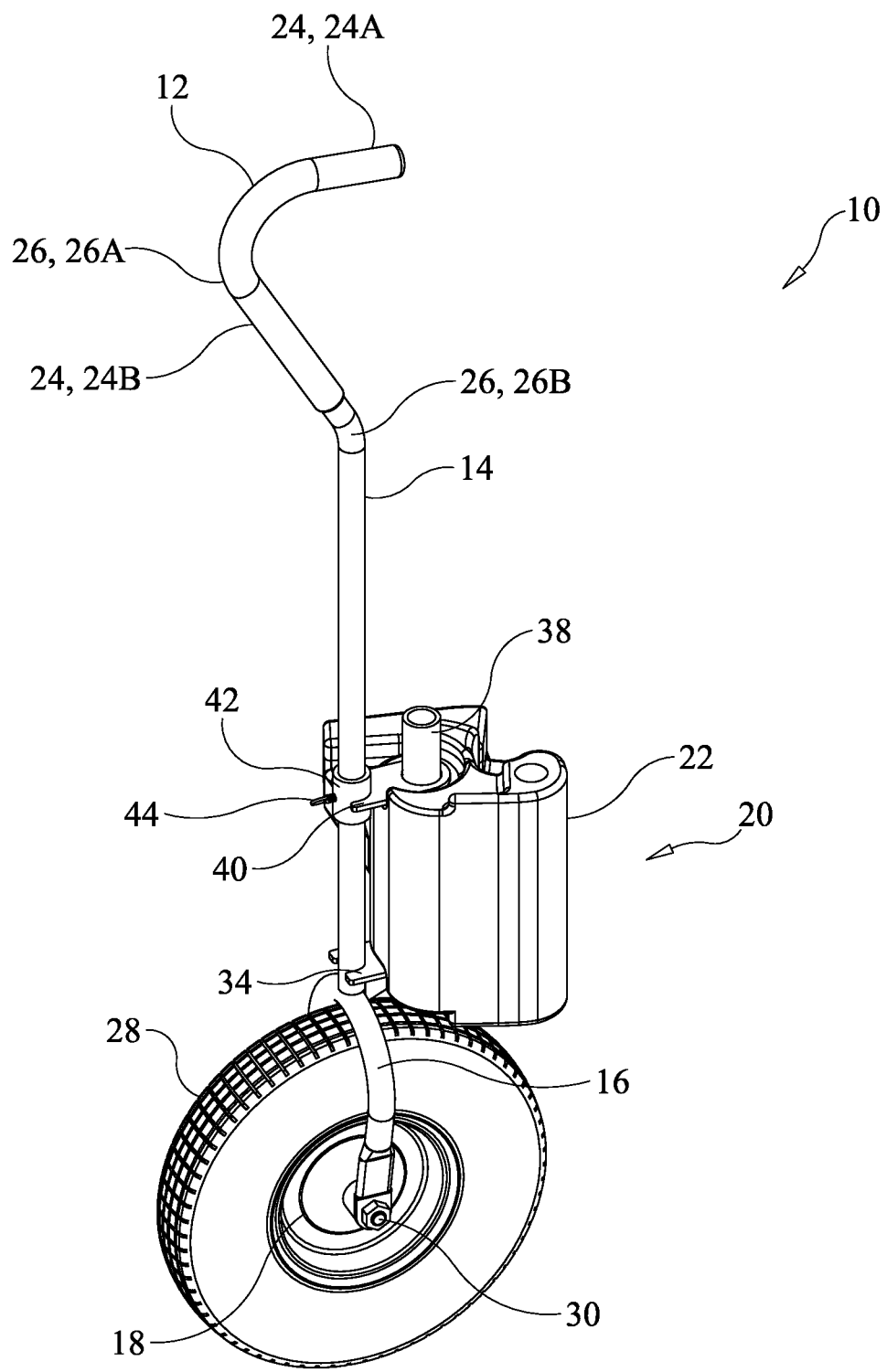
FIG. 12 is an operational view of a compact knuckle carrier, according to one aspect of the present disclosure.

With reference to FIG. 1 through FIG. 12, but with particular reference to FIG. 11 and FIG. 12, carrier 10 may be utilized in transporting a train coupler knuckle, such as knuckle 22, across distance. Specifically, as mentioned above, carrier 10 may offer a lightweight, compact, easily stored system for carrying a train knuckle from a first point to a second point. It is common in the railroad industry for trains, particularly long and heavily-laden freight trains, to suffer a breakage or failure of a coupling knuckle, such as knuckle 22 which is operable to couple adjacent railcars within the train. When a knuckle fails, it typically cannot be repaired and/or cannot be repaired onsite. Therefore, it is common practice to have one or more spare knuckles, such as knuckle 22, onboard the engine for ready replacement in the event of a knuckle failure. In such an event, the engineer must retrieve a replacement knuckle from its storage position and transport it to the location of the knuckle failure. Often, as these trains can be long, with some stretching over 1.5 miles or more, the railroad employee or engineer must transport the knuckle a significant distance from its storage position in the engine compartments to the location of the knuckle failure. As these knuckles can be heavy, this is a daunting task that often requires a second person and/or some form of transport device. Carrier 10, therefore, may be utilized in transporting a knuckle over distance and over potentially rough terrain such as ballast or other uneven surfaces typically found surrounding train tracks, while sparing the engineer the need for a second person and/or providing relief in transporting a heavy replacement knuckle over a long distance.

Accordingly, in the event of a knuckle failure wherein a replacement knuckle is required, the engineer or train operator may first retrieve carrier 10 from a storage position given that carrier 10 is compact and only utilizes a single wheeled assembly, it may be more easily and readily stored and retrieved while taking up minimal space of already limited space within the locomotive cabin. Alternatively, carrier 10 configured as described herein, can be stored in other less conventional or common ways such as hanging carrier 10 from an elevated position such as a ceiling, wall, or the like via a hook. Further, given the strength of materials and robustness of carrier 10, carrier 10 may be stored on an exterior wall of the engine if desired so as to not occupy space within the engine cabin.

Once the operator retrieves carrier 10 from its storage position, the operator may install a knuckle 22 thereon. Specifically, as best seen in FIG. 11, the operator may remove or loosen thumbscrew 44 from lock collar 42 and may slide lock collar 42 vertically along body 14 to provide clearance for knuckle 22. The sliding lock collar 42 vertically is indicated by Arrow A in FIG. 11. Once the lock collar 42 and lock plate 40 are clear of support member 38, knuckle 22 may be moved into position over support member 38 as indicated by the dashed lines in FIG. 11. Namely, the aperture 46 on knuckle 22 is aligned with the support member 38 and slid downwardly towards the wheel 18 with the aperture 46 slidably receiving the support member 38. Once knuckle 22 is slid down over support member 38 and placed in contact with support plate 34, lock collar 42 may be slid downward into position above knuckle 22 such that aperture 52 in lock plate 40 may slide over a portion of support member 38 and contact an upper portion of knuckle 22. Once in position, thumbscrew 44 may be tightened and, in embodiments wherein body 14 includes a screw aperture 50, thumbscrew 44 may be aligned therewith and tightened to have at least a portion inserted into aperture 50 to secure lock collar 42 and lock plate 40 in position, thus further securing knuckle 22 onto support member 38. In embodiments wherein aperture 50 is not present, thumbscrew 44 may be tightened until sufficient tension exists to secure lock collar 42 and lock plate 40 in position.

With knuckle 22 thus installed on knuckle assembly 20 and carrier 10, the engineer may then utilize handle 12 and/or grips 24 to steer and/or otherwise transport (i.e., push or pull) knuckle 22 to the desired location, i.e. the location of knuckle failure, to allow replace of the damaged or broken knuckle 22. As configured and shown in the figures, it is contemplated that, during operation, the knuckle 22 will be transported above body 14 as handle is lowered to allow for the operator to utilize carrier 10. The lowering of the handle "tilts" the carrier towards the ground to define an acute angle of the body 14 relative to the ground surface. This configuration further supports the weight of the knuckle above the wheel making carrier 10 more efficient and easier to maneuver as opposed to the weight of the knuckle being supported below the body 14 of carrier 10. This further allows the weight of knuckle 22 to be distributed throughout the entire carrier 10 and reduces the stress and fatigue placed on support member 38, support plate 34, and gusset 36.

Once the knuckle 22 is transported to the desired location, the replacement knuckle 22 may be removed from carrier by reversing the previous steps. In particular, thumbscrew 44 may be loosened and lock collar 42 and lock plate 40 may be slid vertically out of the way and knuckle 22 may be raised up and off of support member 38 to remove it therefrom. Once the broken or damaged knuckle on the train is replaced with knuckle 22, the broken or damaged knuckle may be similarly transported back to the engine compartment for storage and transport to a railyard or repair location, as desired or necessary.

Accordingly, carrier 10 may provide a single wheeled compact and easily stored system which may allow a single individual to transport a heavy knuckle, such as knuckle 22, over a significant distance with reduced fatigue and/or stress applied to the train employee and without the need for a second individual. This may allow for a more safe operation as injuries caused by fatigue may be reduced and the second individual may monitor or maintain the engine and/or train while the user of carrier 10 may handle the replacement of a broken or damaged knuckle. Accordingly, carrier 10 provides benefits in the railroad industry in that it is compact and easily stored, taking up minimal space while providing a robust and safer system for use by a single individual in transporting and utilizing knuckle 22, as described herein.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A knuckle carrier comprising:
   a body having a handle at a first end thereof;
   a single wheel at a second end of the body of the knuckle carrier;
   a support member on the body of the knuckle carrier, the support member being configured to carry a coupler knuckle;
   a support plate attached to the body of the knuckle carrier proximate the wheel;
   wherein the support member extends vertically from the support plate; and
   a slidable lock plate operable to lock the coupler knuckle in place on the support member.

2. The knuckle carrier of claim 1 wherein the slidable lock plate further further comprises:
   an aperture defined therethrough operable to engage at least a portion of the support member.

3. The knuckle carrier of claim 2 wherein the slidable lock plate further comprises:
   a lock collar having a thumbscrew aperture defined therethough; and
   a thumbscrew operable to engage the thumbscrew aperture in the lock collar and the body of the knuckle carrier to secure the lock collar and lock plate in position relative to the body of the knuckle carrier.

4. The knuckle carrier of claim 1 further comprising:
   at least one grip on the handle of the body; and
   wherein the single wheel further comprises:

a flat-free solid wheel.

5. The knuckle carrier of claim 1 wherein the knuckle carrier is operable to be stored within an engine of a locomotive train.

6. The knuckle carrier of claim 1 wherein the coupler knuckle is supported by the knuckle carrier in a position above the body of the knuckle carrier when the knuckle carrier is operated at an acute angle relative to a ground surface.

7. The knuckle carrier of claim 1 wherein the handle comprises a first curved portion and a second curved portion.

8. The knuckle carrier of claim 7, wherein the handle comprises a first grip portion and a second grip portion, wherein the second grip portion is located between the first curved portion and the second curved portion.

9. The knuckle carrier of claim 1, wherein the second end of the body defines a wheel fork, wherein the single wheel is coupled to the wheel fork.

10. The knuckle carrier of claim 1, wherein a portion of the body between the first end and the second end is a straight section of tubular steel.

11. The knuckle carrier of claim 10, further comprising:
a wheel fork connected to the straight section of tubular steel at a joint, wherein the joint is one of a fixed connection and a moveable connection.

12. The knuckle carrier of claim 1, further comprising:
a support gusset connected to the body and the support plate.

13. The knuckle carrier of claim 12, wherein the support gusset is located closer to the second end of the body than the support member and the support plate.

14. The knuckle carrier of claim 1, wherein the slidable lock plate and a lock collar are formed as a singular unit, wherein the lock collar slides along the body, wherein sliding movement of the singular unit has a clearance above the support member that is adapted to allow space for the coupler knuckle to be installed on and removed from the support member.

15. The knuckle carrier of claim 1, further comprising:
an aperture defined in the slidable lock plate, wherein the aperture is sized to receive the support member and the slidable lock plate is operable to lock the coupler knuckle in place on the support member.

16. The knuckle carrier of claim 1, further comprising:
an aperture defined in the slidable lock plate, wherein the aperture is operable to engage at least a portion of the support member, and wherein the slidable lock plate further comprises:
a lock collar having a thumbscrew aperture defined therethrough; and
a thumbscrew operable to engage the thumbscrew aperture in the lock collar and the body of the knuckle carrier to secure the lock collar and lock plate in position relative to the body of the knuckle carrier;
at least one grip on the handle of the body;
wherein the knuckle carrier is operable to be stored within an engine of a locomotive train;
wherein the coupler knuckle is supported by the knuckle carrier in a position above the body of the knuckle carrier when the knuckle carrier is operated at an acute angle relative to a ground surface.

17. The knuckle carrier of claim 1, wherein a portion of the support member is shaped complementary to an aperture defined in the coupler knuckle.

18. The knuckle carrier of claim 1, wherein a diameter of the support member is complementary to or slightly smaller than a diameter of an aperture on the coupler knuckle.

19. The knuckle carrier of claim 1, further comprising:
an axle of the single wheel that permits the body to be tilted downward to an acute angle relative to ground in response to lowering movement of the handle.

20. The knuckle carrier of claim 1, wherein the support member is spaced apart and parallel to the body.

\* \* \* \* \*